Dec. 28, 1965 R. H. TERLET 3,226,554

CASCADE STORAGE APPARATUS

Filed July 18, 1962 2 Sheets-Sheet 1

INVENTOR.
RENÉ H. TERLET

BY Curtis Riles Jr.

ATTORNEY

CASCADE STORAGE APPARATUS

Filed July 18, 1962 2 Sheets-Sheet 2

United States Patent Office
3,226,554
Patented Dec. 28, 1965

3,226,554
CASCADE STORAGE APPARATUS

Rene H. Terlet, San Jose, Calif., assignor to International Business Machines Corporation, New York, N.Y., a corporation of New York Filed July 18, 1962, Ser. No. 210,654
7 Claims. (Cl. 250—209)

This invention relates to a storage circuit for storing a count of the number of serial input signal pulses received, and more particularly to an improved count storage circuit in which the count may be reduced as well as increased.

Many storage circuits which are capable of receiving and storing signals to be counted have been devised in the past. However, such count storage circuits generally are not capable of counting down as well as counting up. Many count storage circuits conventionally employ the principle of carrying digits to higher orders in order to register higher count values, while resetting the lower order digit storage devices. In this class of counters, counting down involves the difficult operation of borrowing from the higher orders when the count is to be reduced and when the lower orders are zero.

Accordingly, it is one of the objects of this invention to provide a storage circuit for storing a count of input signal pulses which can be easily counted up or counted down without requiring carry or borrow operations.

Another class of prior art counters may be broadly identified as "ring" counters in which a shift occurs in the energized stage of the counter in response to each new signal pulse to be counted. In this class of counting circuits, if the count is to be reduced, a reversal of the shift circuits must be made. The reversal of the shift circuits involves a considerable complication of circuitry, and generally involves a time delay in conditioning the ring circuit for the reverse shift operation.

Accordingly, it is another important object of the present invention to provide a storage circuit for the storage of a count in which the count may be increased or decreased very simply and without the necessity for any reversals of shifting circuitry.

Another object of the present invention is to provide a counting circuit combination including at least two count storage circuits which are interconnected in such a way as to indicate which of the count storage circuits received the first signal input pulse, and to cause that counting circuit to be the first to have its count reduced.

In the production of apparatus for logical computations, maintaining low production costs is extremely important. In attempting to lower such production costs, efforts have been made to employ inexpensive switching combinations, such as combinations of lamps and photoconductors. These inexpensive devices have been thought to be quite unreliable because of extreme variations in operating speed characteristics depending upon various operating conditions such as ambient illumination, temperature, and the duration of any prior dormant period prior to the device operation.

Accordingly, it is one of the objects of the present invention to provide count storage circuits and systems of the above description in which reliability is unimpaired by extreme variations in component operating speeds.

In carrying out the above objects of this invention in a preferred embodiment thereof, there may be provided a plurality of cascade connected storage devices in which the first of the devices is arranged to receive input signal pulses to be stored and counted. Each of the storage devices includes a latching circuit for maintaining the device in an energized condition after it is once energized. Each storage device also includes a pick-up switch element connected to energize the next following storage device and a disabling circuit comprising a switching device connected to disable a prior storage device. Output switching devices are associated with selected ones of said storage devices to indicate the count which is stored, and a signal removal device is connected to disable the last of the storage devices for reducing the stored count by one in response to a removal pulse signal. The storage devices may be embodied as voltage responsive light sources and the associated switch elements may be embodied as photoconductors arranged for illumination thereby. A plurality of the cascade connected storage device circuits may be interconnected to their final storage devices and interlocked to provide for storage in only one of the final storage devices. A common signal removal device is provided to disable all of the last of the storage devices and which is operable for reducing the stored count only in the single last storage device which contains a count.

Further objects and advantages of the invention will be apparent from the following description and the accompanying drawings which are briefly described as follows.

Figure 1:
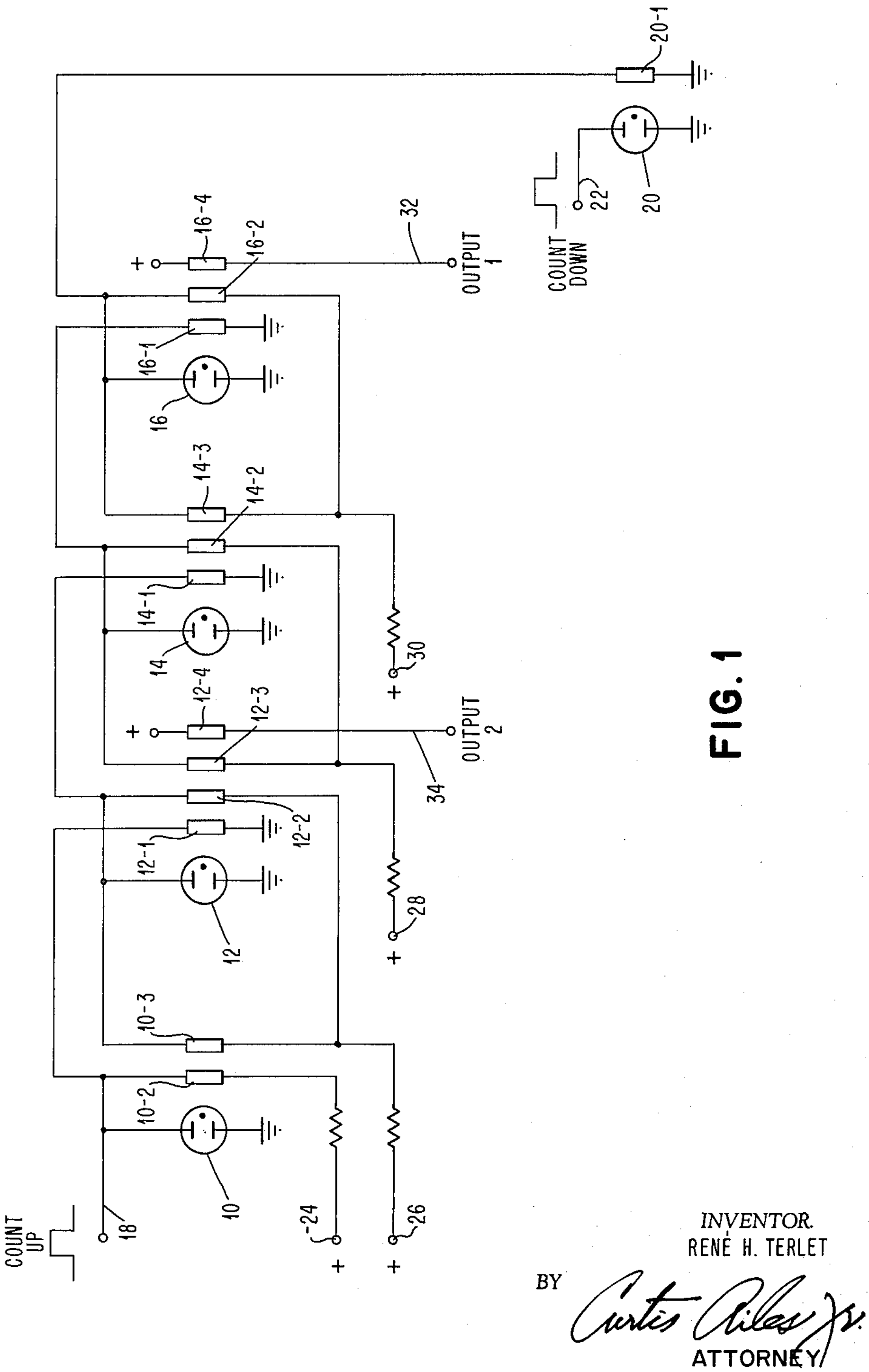
FIG. 1 is a schematic circuit diagram of a neon-photoconductor circuit embodiment of the present invention.

Referring more particularly to FIG. 1, there is shown a plurality of cascade connected storage devices in the form of neon lamps 10, 12, 14, and 16 together with associated photoconductors. The first device 10 is provided with an input connection indicated at 18 for receiving input signal pulses to be counted and stored. Each of the lamps 10, 12, 14, and 16 is provided with associated photoconductors arranged for illumination thereby. Thus, lamp 10 illuminates associated photoconductors 10–2 and 10–3, lamp 12 illuminates associated photoconductors 12–1, 12–2, 12–3, and 12–4, lamp 14 illuminates associated photoconductors 14–1, 14–2, 14–3, and lamp 16 illuminates associated photoconductors 16–1, 16–2, and 16–4. A count-down device is provided in the form of a lamp 20 which illuminates an associated photoconductor switching device 20–1. Device 20 is provided with an input connection 22 for receiving count-down input pulses.

When an input signal pulse to be counted is received by device 10 at input connected 18, the devices 10, 12, 14, and 16 operate in a sequence and the lamp 16 then remains illuminated while lamps 10, 12, and 14 are shut off. A single pulse is thereby stored. Operation of lamp 20 by a count-down pulse received at connection 22 disables the lamp 16 and thereby removes a stored count. However, if a second input pulse is received while lamp 16 continues in operation, lamps 10 and then 12 will be operated in sequence, then lamp 10 will be extinguished and lamp 12 will remain in operation to signify the storage of two. If the system is now counted down by the operation of lamp 20 to the extinguish lamp 16, the count previously stored in lamp 12 will precess through the operation of lamps 14 and 16 in succession and lamps 12 and 14 will then be extinguished, leaving the single count storage signified by the illumination of lamp 16 only.

Throughout the drawing, the small rectangular symbols such as are used for photoconductors 10–2 and 10–3 signify devices which have photoresponsive properties which are commonly referred to as photoconductors. Since they are devices which have a lowered impedance when they are illuminated, they are more accurately described as photoresponsive impedance devices, but the popular "photoconductor" term is used in this specification.

The preferred photoconductor devices will be described more fully below. Throughout the drawing the convention is followed that each photoconductor device is illuminated only by the first lamp positioned to the left of that photoconductor in the drawing. Thus, both photoconductors 10–2 and 10–3 are illuminated only by lamp 10, and they are not illuminated by lamp 12.

Each of the lamps 10, 12, 14, and 16 is provided with a self-energizing latching circuit including one of the associated photoconductors. Thus, photoconductor 10–2 forms a latching circuit which applies power from a source indicated schematically by the terminal 24 to the lamp 10 as soon as lamp 10 is illuminated. A similar self-energizing latching circuit is provided for lamp 12 through associated photoconductor 12–2 from the power terminal indicated at 26. Similar self-latching circuits also are provided for lamps 14 and 16 by photoconductors 14–2 and 16–2, respectively, from power terminals 28 and 30.

The photoconductor 10–3 forms a pick-up switch element for lamp 12. Whenever the photoconductor 10–3 is illuminated by lamp 10 the photoconductor 10–3 completes a circuit which provides power from the terminal 26 to the lamp 12. In a similar manner, photoconductor 12–3 provides a pick-up circuit for lamp 14 and photoconductor 14–3 provides a pick-up circuit for lamp 16. On the basis of the presence of the successive pick-up circuit photoconductors, it would appear that whenever lamp 10 is illuminated, the other three lamps 12, 14, and 16 would all be likewise illuminated. However, the photoconductor 12–1 associated with lamp 12 provides a disabling circuit for lamp 10 which connects the lamp 10 to ground and thus extinguishes lamp 10 as soon as illumination is received from lamp 12. Similarly, the disabling circuit provided by photoconductor 14–1 extinguishes lamp 12, and the disabling circuit provided by photoconductor 16–1 extinguishes lamp 14. Also, the count-down device photoconductor 20–1 operates in a similar manner to disable lamp 16 whenever a count-down signal is received.

Photoconductor 16–4 associated with lamp 16 provides a count indicating output circuit 32 indicating a count of one. Similarly, photoconductor 12–4 associated with lamp 12 energizes an output circuit 34 indicating a count of two.

A more detailed explanation of the operation of the circuit of FIG. 1 is as follows: When an input signal pulse to be counted is received at 18, lamp 10 is illuminated and latched in the illuminated condition by energy received from terminal 24 through latching photoconductor 10–2. Voltage is also provided from terminal 26 through pick-up photoconductor 10–3 to provide a pick-up signal to illuminate lamp 12. When this illumination is sufficient, lamp 12 is latched on through latching photoconductor 12–2 and lamp 10 is disabled through the operation of disabling photoconductor 12–1. Also, power is supplied from terminal 28 through pick-up photoconductor 12–3 to energize lamp 14. Lamp 14 latches on through photoconductor 14–2, disables lamp 12 through disabling photoconductor 14–1 and energizes lamp 16 through pick-up photoconductor 14–3. Lamp 16 then latches on through latching photoconductor 16–2 and disables lamp 14 through disabling photoconductor 16–1. Lamp 16 then remains on the sustained output signal provided through photoconductor 16–4 at output connection 32 indicates the storage of a single pulse.

As long as lamp 16 is energized, the disabling photoconductor 16–1 maintains lamp 14 in its disabled condition. Thus, when a new input signal pulse is received at 18, it can progress no farther than lamp 12. This is true because the pick-up circuit provided by photoconductor 12–3 is ineffective to pick-up lamp 14 in the presence of the disabling circuit provided by the illuminated disabling photoconductor 16–1. Thus, the second pulse is stored in lamp 12, and the sustained illumination of lamp 12 provides a sustained output signal through photoconductor 12–4 to the output connection 34 indicating that two pulses have been stored. It is quite apparent that the capacity of this system may be increased indefinitely by providing additional storage device lamps such as 12 and 14 between the input device 10 and the final device 16. It is apparent also that for every two such devices which are added in the cascade circuit, an additional count may be stored.

When the system is counted down by energization of the count-down device lamp 20 through connection 22, device 16 is disabled through disabling photoconductor 20–1. Then the disabling photoconductor 16–1 is no longer effective to keep lamp 14 off, and as a consequence lamp 14 turns on and lamp 12 then turns off through the operation of the disabling photoconductor 14–1. Then, as soon as the count-down device lamp 20 goes off, removing the disablement of device 16, 16 goes on and 14 goes off through the operation of disabling photoconductor 14–1. If the circuit is expanded to a larger size than shown, and if a larger number of pulses is stored, then all of the stored signals are moved two places to the right when the system is counted down. This movement of the pulses without the need for external propagation is defined for the purpose of this invention as "dribble down" operation. The pulses dribble down from the first stage toward the last.

Figure 2:
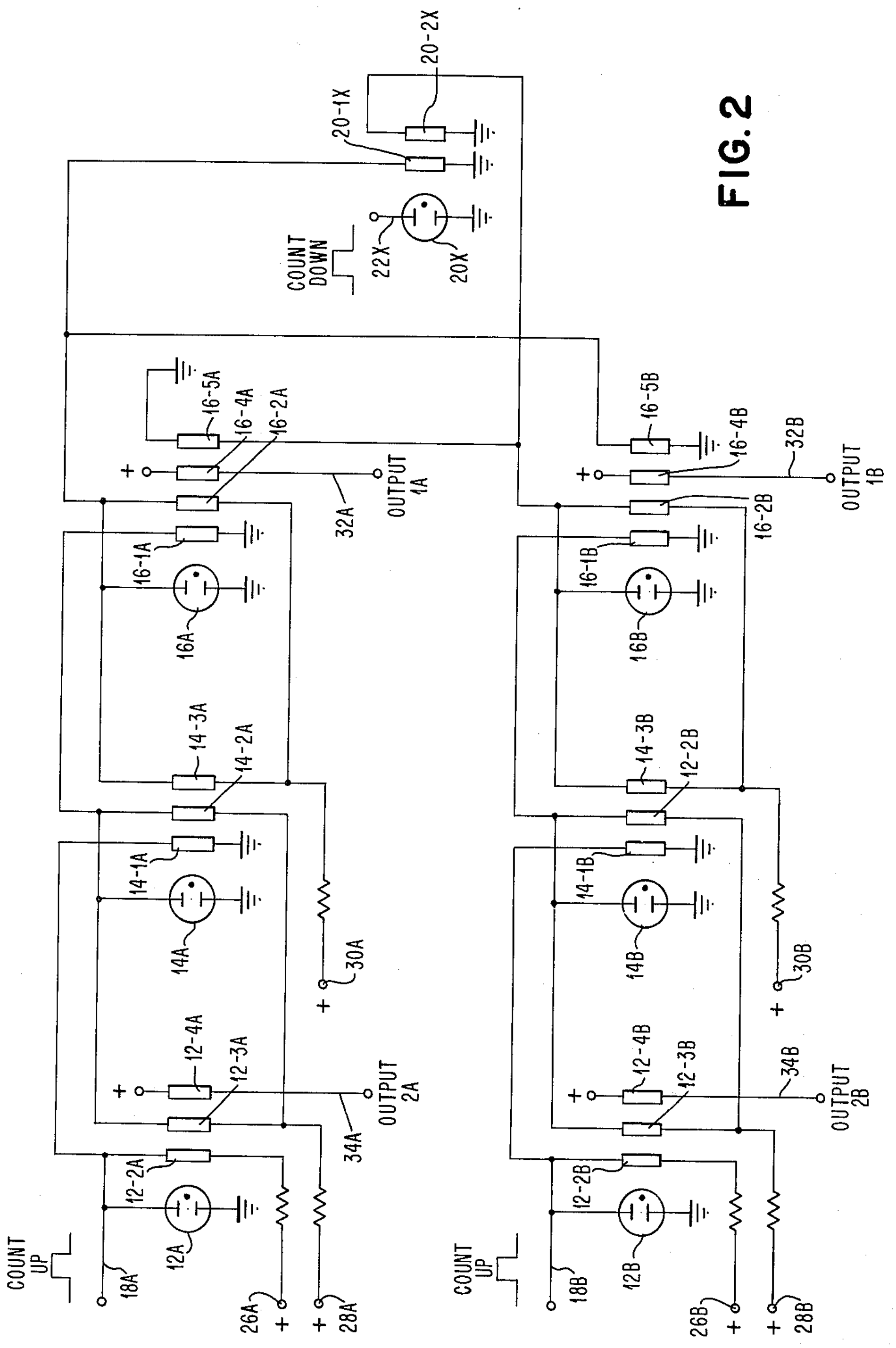
FIG. 2 is a schematic circuit diagram of a count storage circuit system employing two count storage circuits, and in which only one of the storage circuits is counted down at a time.

FIG. 2 is a schematic circuit diagram illustrating a useful system which employs a combination of two of the count storage circuits of FIG. 1. The two count storage circuits are interlocked so that only one of the two circuits can register a "one" count and a common count-down circuit is provided which counts down only that circuit which is registering the "one" count. In order to clearly indicate the relationship between FIG. 1 and FIG. 2, all of the components of the first of the count storage circuits of FIG. 2 which have corresponding parts in FIG. 1 are similarly lettered, but with the suffix "A"; and all of the corresponding components in the second storage circuit of FIG. 2 are similarly identified, but with the suffix "B". In the count storage circuits of FIG. 2, the first storage lamp device 10 and its associated photoconductors have been omitted and the input connections 18A and 18B have been made directly to the storage lamps 12A and 12B. The operation of each of the count storage circuits, taken individually, is essentially the same as was described above in connection with FIG. 1. For instance, an input pulse at 18A proceeds through the lamps 12A, 14A, and 16A and remains stored through the illumination of lamp 16A. The common count-down device is identified in FIG. 2 as 20X, having an input connection 22X and associated photoconductors 22–1X and 22–2X. When a count-down signal is received by the device 20X, the lamp 16A is disabled through the operation of the disabling photoconductor 20–1X.

However, if an input signal pulse is first received at input connection 18B, the resultant storage of a count by the illumination of lamp 16B causes a disablement of the lamp 16A because of the provision of a new disablement photoconductor 16–5B which is arranged for illumination by lamp 16B and which is connected to ground and disable the lamp 16A. If a new input pulse is then applied at 18A, the precession of the signal cannot proceed beyond lamp 14A because of the disablement of 16A by 16B. Accordingly, the only "one" count storage output which is available is that which is available at the output 1B connection 32B. However, when the count-down signal is received by lamp 20X, the only count which is removed is that count which is stored in 16B, and the count previously held up at lamp 14A then continues to the lamp 16A after the count-down signal terminates. It is apparent from the diagram that the circuit of FIG. 2 is symmetrical. That is, a disabling photoconductor 16–5A is also provided for illumination by 16A and connected to disable 16B so that whenever 16A is first illuminated, 16B cannot be illuminated.

The system of FIG. 2 is particularly useful in a larger system in which a single count is to be stored at all times in either one of the two count storage circuits, and in which a second count is to be received by one of the two storage circuits before a count-down signal is received. The system will handle a succession of operations each including a single count-up signal to one or the other of the count storage circuits at the inputs 18A and 18B, succeeded always by a count-down signal. The system is particularly useful, for instance, in a larger system such as the serial adder process unit shown in United States patent application Serial No. 72,489, filed by Rex Rice on November 29, 1960, for "Arithmetic Circuits," and assigned to the same assignee as the present application. In such a system, the FIG. 2 system may be utilized for the purpose of storing a carry from one order, and then transmitting the carry to the higher order on the succeeding cycle. If there is no carry, a signal is also required. Thus, the information that a carry is required may constitute the input signal at 18A, and the converse information that a carry is not required may constitute the signal at 18B. If the information is "carry," after the next count-down signal which indicates that the larger system is ready to commence the addition operation on a new digit, the carry signal proceeds to the storage lamp 16A and a carry information output signal is then available to the larger system at output 1A. Conversely, if a "no carry" signal is called for, the opposite output is available at output 1B.

It will be apparent that there are various other useful applications for the system of FIG. 2. It will be apparent also that more than two count storage circuits could be similarly interlocked together with a common count-down arrangement for the recognition of three or more different situations.

In portions of this specification, the count-up operation of the count storage circuit when an input pulse is received may be referred to as an "incrementing" operation, and the count-down operation in which counts are removed from storage may be referred to as a "decrementing" operation.

As previously mentioned above, although the photoresponsive devices as illustrated in the embodiments of this invention are referred as "photoconductors" it should be emphasized that these devices, as employed in the system of the present invention, are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the description of the circuits, for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New city, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE–2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance, photoconductive devices are selected which are particularly responsive to the spectrum of light emitted by the light source employed. Fortunately, the neon lamps mentioned above and the photoconductive devices mentioned above work well together. Accordingly, the neons are preferred and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. Although impedance values for the various circuit components are not specified, it will be understood that whenever operation is required to provide output illumination, the series impedances for the various neons generally will be chosen as to result in a neon current in the order of one milliampere.

In order to simplify the drawings and make them clearer and more easily understood, the lamp shunt impedances are omitted from the drawings; but it will be understood that such impedances are to be employed in the practical embodiments of the invention. Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

While the invention has been particularly shown and described with reference to preferred embodiments thereof, it will be understood by those skilled in the art that various changes in form and details may be made therein without departing from the spirit and scope of the invention.

What is claimed is:

1. A pulse signal storage system for storing successive pulse signals signifying different values of related information comprising:
(a) an individual pulse signal storage circuit for each value of such information,
(1) each of said pulse signal storage circuits comprising a plurality of cascade connected storage devices,
(i) the first of said devices including an input connection for receiving input signal pulses to be stored,
(ii) each of said storage devices comprising
(A) a latching circuit including a switch element connected to a power source for maintaining said device in an energized condition after a signal pulse is received,
(B) a pick-up switch element connected to energize the next following storage device,
(C) and each storage device after said first storage device including a disabling circuit comprising a switching device connected to disable a preceding storage device,
(b) the last said storage device of each of said pulse signal storage circuits including an additional disabling circuit comprising a switching device connected to disable each of the others of said last storage devices in said other pulse signal storage circuits so that only one of said last storage devices may remain energized on a static basis,
(c) and a signal removal device connected to all said last storage devices to disable all of said last storage devices of all of said pulse signal storage circuits in response to a removal pulse signal and thereby reduce the stored count in the single last storage device which is energized.

2. A storage system for storing successive incrementing pulse signals signifying different values of related information comprising:
(a) an individual pulse signal storage circuit for each value of such information,
(b) each of said pulse signal storage circuits comprising a plurality of cascade connected voltage responsive lamp and photoconductor combinations,
(1) each of said combinations comprising a lamp and a plurality of photoconductors responsive to illumination by said lamp,
(2) the first of said combinations including an input connection for jointly receiving the incrementing signal pulses to be stored and illuminating the lamp of said first combination,
(3) each of said combinations including a latching photoconductor forming a latching circuit, said latching circuit connects power for maintaining the lamp of said combinations in the illuminated condition after a pulse is received by said combinations,
(4) each of said combinations except the last including an energizing photoconductor connected to form an energizing circuit from a power source to the lamp of the next following combination,
(5) and each combination after said first combination including a disabling photoconductor forming a disabling circuit connected to shunt and extinguish the lamp of the preceding combination,
(c) output photoconductors responsive to selected ones of said combinations and forming output circuits operable in response to illumination of the lamps in said selected ones of said combinations to indicate the number of signals stored,
(d) said storage system including a signal removal lamp and photoconductor combination forming circuits connected to shunt and disable the last of said combinations of each of said pulse signal storage circuits for decrementing said circuits in response to a decrementing pulse signal.

3. Apparatus for receiving discrete signal pulses and for storing a count of the number of such pulses received comprising:
(a) a plurality of electrical cascade connected storage devices,
(1) the first of said devices including an input connection for receiving input signal pulses to be stored,
(2) some of said storage devices each comprising
(i) a latching circuit for maintaining said device in an energized condition after a signal pulse is received,
(i) a pick-up circuit connected to energize the next following storage device,
(iii) a disabling circuit connected to disable a preceding storage device,
(iv) first connecting means coupling said latching circuit electrically in parallel with the pick-up circuit of a preceding stage, and second connecting means coupling the parallel combination electrically in series with the disabling circuit of a succeeding stage; the connecting means thereby causing the input pulses to dribble down from the first of said devices toward the last,
(b) and a signal removal device connected to the last of said storage devices to disable the last of said storage devices and thereby reduce the stored count by one in response to a removal pulse signal.

4. Apparatus for receiving discrete signal pulses and for storing a count of the number of such pulses received comprising:
(a) a plurality of electrical cascade connected storage devices,
(1) the first of said devices including an input connection for receiving input signal pulses to be stored,
(2) some of said storage devices each comprising
(i) a latching circuit for maintaining said device in an energized condition after a signal pulse is received,
(ii) a pick-up circuit connected to energize the next following storage device,
(iii) a disabling circuit connected to disable a preceding storage device,
(iv) first connecting means coupling said latching circuit electrically in parallel with the pick-up circuit of a preceding stage, and second connecting means coupling the parallel combination electrically in series with the disabling circuit of a succeeding stage; the connecting means thereby causing the input pulses to dribble down from the first of said devices toward the last,
(b) output switching devices associated with selected ones of said storage devices and operable therewith to indicate the number of signals stored,
(c) and a signal removal device connected to the last of said storage devices to disable the last of said storage devices and to thereby reduce the stored count by one in response to a removal pulse signal.

5. A counter which may be incremented and decremented by discrete signal pulses comprising:

(a) a plurality of cascade connected voltage resposive lamp and photoconductor combinations, (1) each of said combinations comprising a lamp and a plurality of photoconductors responsive to illumination by said lamp, (2) the first of said combinations including an input connection for receiving incrementing signal pulses, (3) each of said combinations including a latching photoconductor forming a latching circuit for maintaining said lamp in said combination in the illuminated condition after it is once energized, (4) each of said combinations except the last including an energizing photoconductor connected to form an energizing circuit for the next following combination, (5) and each combination, following said first combination by at least a predetermined number of said combinations, including a disabling photoconductor forming a disabling circuit connected to shunt and extinguish the lamp of the combination preceding said combination of said disabling circuit by said predetermined number, (6) a plurality of said combinations including first connecting means coupling said latching photoconductor into a parallel circuit with the energizing photoconductor of the preceding combination, and second connecting means coupling said parallel circuit into a series circuit with the disabling photoconductor of the next following stage; the connecting means thereby causing the incrementing signal pulses to dribble down from the first of said combinations toward the last, (b) output photoconductors responsive to selected ones of said combinations and forming output circuits operable in response to illumination of the lamps in said selected ones of said combinations to indicate the number of signals stored, (c) and a signal removal lamp and photoconductor combination including shunting photoconductors forming circuits connected to shunt and disable a number of the last of said combinations equal to said predetermined number for decrementing said counter in response to a decrementing pulse signal.

6. A counter which may be incremented and decremented by discrete signal pulses comprising:

(a) a plurality of electrical cascade connected storage devices, (1) the first of said devices including an input connection for receiving increment signal pulses to be stored, (2) some of said storage devices each comprising (i) a latching circuit for maintaining said device in an energized condition after a signal pulse is received, (ii) a pick-up circuit connected to energize the next following storage device, (iii) a disabling circuit connected to disable the preceding storage device, (iv) first connecting means coupling said latching circuit electrically in parallel with the pick-up circuit of a preceding stage, and second connecting means coupling the parallel combination electrically in series with the disabling circuit of a succeeding stage; the connecting means thereby causing the increment signal pulses to dribble down from the first of said devices toward the last, (b) output switching devices responsive to selected ones of said storage devices and operable therewith to indicate the number of signals stored, (c) and a signal removal device connected to disable the last of said storage devices for decrementing said counter in response to a decrementing pulse signal.

7. A count storage apparatus which may be incremented and decremented by discrete signal pulses comprising:

(a) a plurality of cascade connected voltage responsive lamp and photoconductor combinations, (1) each of said combinations comprising a lamp and a plurality of photoconductors responsive to illumination by said lamp, (2) the first of said combinations including an input connection for jointly receiving electrical incrementing signal pulses to be stored and illuminating the lamp of said first combination, (3) each of said combinations including a latching photoconductor forming a latching circuit, said latching circuit connects power for maintaining the lamp in said combinations in the illuminated condition after a pulse is received by said combinations, (4) each of said combinations except the last including an energizing photoconductor connected to form an energizing circuit from a power source to the lamp of the next following combination, (5) and each combination after said first combination including a disabling photoconductor forming a disabling circuit connected to shunt and extinguish the lamp of the preceding combination, (6) a plurality of said combinations including first connecting means coupling said latching photoconductor into a parallel circuit with the energizing photoconductor of the preceding combination, and second connecting means coupling said parallel circuit into a series circuit with the disabling photoconductor of the next following stage; the connecting means thereby causing the incrementing signal pulses to dribble down from the first of said combinations toward the last, (b) output photoconductors responsive to selected ones of said combinations and forming output circuits operable in response to illumination of the lamps in said selected ones of said combinations to indicate the number of signals stored, (c) and a signal removal lamp and photoconductor combination including a shunting photoconductor forming a circuit connected to the last of said combinations to shunt and disable the last of said combinations for decrementing said counter in response to a decrementing pulse signal.

References Cited by the Examiner

UNITED STATES PATENTS

| | | | |
|---|---|---|---|
| 2,895,054 | 7/1959 | Loebner | 250—213 |
| 2,985,763 | 5/1961 | Ress | 250—208 |
| 3,017,542 | 1/1962 | Pearce | 317—140 |
| 3,040,178 | 6/1962 | Lyman et al. | 250—213 |
| 3,042,807 | 7/1962 | Vize | 250—213 |
| 3,070,702 | 12/1962 | Marko | 250—213 |
| 3,073,963 | 1/1963 | Marko | 250—213 |
| 3,160,756 | 12/1964 | Marko | 250—213 |

RALPH G. NILSON, *Primary Examiner.*

MALCOLM A. MORRISON, *Examiner.*